(No Model.)

A. P. TERRY.
WHEEL.

No. 416,190. Patented Dec. 3, 1889.

Witnesses:
H. B. Hallock.
O. W. Bond.

Inventor:
A. P. Terry.

UNITED STATES PATENT OFFICE.

ARY P. TERRY, OF CHICAGO, ILLINOIS.

WHEEL.

SPECIFICATION forming part of Letters Patent No. 416,190, dated December 3, 1889.

Application filed February 16, 1889. Serial No. 300,188. (No model.)

*To all whom it may concern:*

Be it known that I, ARY P. TERRY, a citizen of the United States, residing at Chicago, in the county of Cook and State of Illinois, have invented certain new and useful Improvements in Wheels; and I do hereby declare that the following is a full, clear, and exact description of the invention, that will enable others skilled in the art to which it pertains to make and use the same, reference being had to the accompanying drawings, forming a part hereof, in which—

Figure 1:
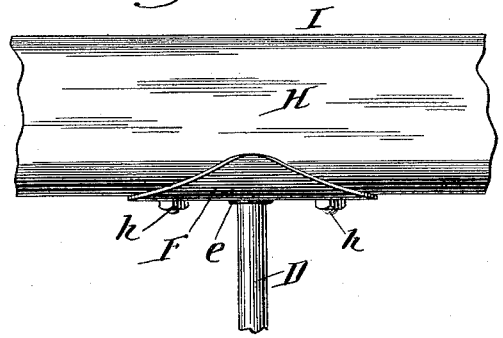
Figure 2:
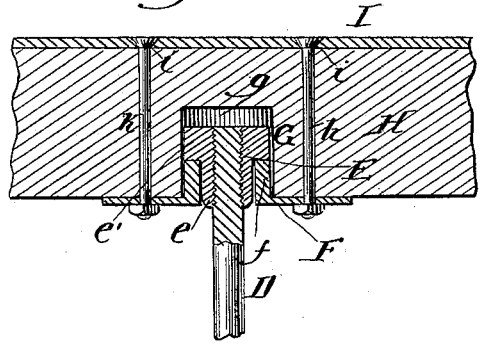
Figure 3:
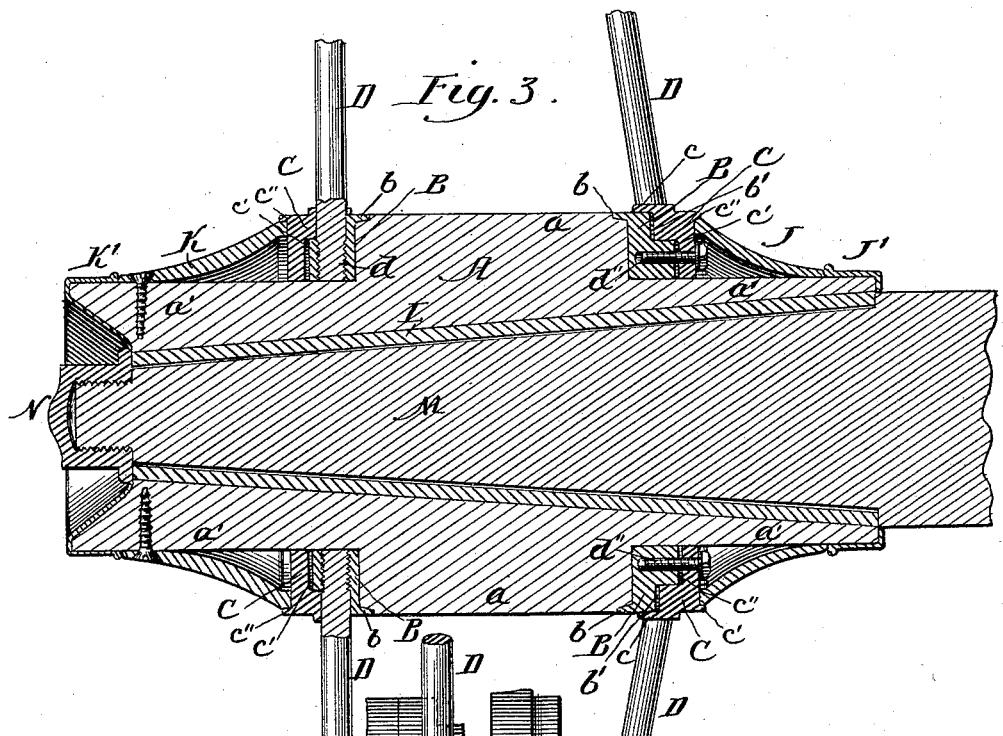
Figure 4:
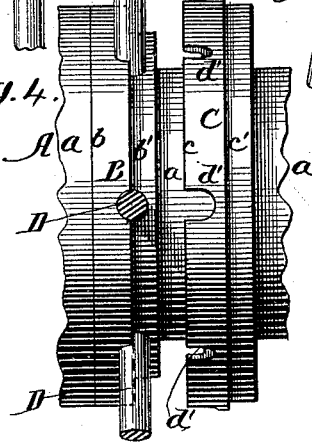

Figure 1 is a side elevation of a portion of a felly with a spoke connected therewith; Fig. 2, a longitudinal section of the parts shown in Fig. 1; Fig. 3, a longitudinal section through the hub, showing the attachment of the spokes to the hub; Fig. 4, a side elevation showing the rings connecting the spokes with the hub, separated one from the other.

This invention relates to that class of wheels which are termed "suspension-wheels," or wheels having the spokes connected with the felly and entered into the hub, so that by turning the spokes the proper strain can be given to the wheel.

The objects of the invention are to improve the means for connecting the spokes with the felly, so that in case of inward springing of the rim of the wheel no injurious effects will be produced on either the spokes or the felly, and to improve the means for attaching the spokes to the hub, so that the spokes are readily adjustable and at the same time are locked firmly in place, preventing rattle or displacement, and the attachment is one by which, in case the spoke is broken at the hub, the piece in the hub can be readily removed for the insertion of a new spoke; and its nature consists in the several parts and combinations of parts hereinafter described, and pointed out in the claims as new.

In the drawings, A represents the hub, made of wood or other suitable material, turned or otherwise formed to have a central portion $a$ and end portions $a'$.

B are rings, one for each side of the center $a$ and fitting snugly around the end $a'$, and made of iron or other suitable material. Each ring B has an annular flange $b$, fitting over the periphery of the center $a$, as shown in Fig. 3, and the outer face of each ring B has an annular recess $b'$, formed by having the outer end of the ring of a less diameter than the inner end.

C are rings, one for each ring B, and made of iron or other suitable material. Each ring C has an annular peripheral flange $c$, to fit over the larger portion of its ring B, and each ring C has a recess $c'$ on its inner face, to receive the smaller portion of the ring B, as shown in Fig. 3, and, as shown, each ring C has a peripheral flange $c''$ around its outer face.

D are the spokes, as many spokes being used as may be desired, and these spokes are to be set staggered on opposite sides of the center of the hub, and, as shown, the outside spokes are set straighter than the inside ones. The lower end of these spokes is screw-threaded, and enters a screw-threaded hole $d$, formed therefor in the smaller portion of the ring B, as shown in Figs. 3 and 4. The requisite number of holes for half the number of spokes is formed in each ring B, and these holes $d$ are screw-threaded to a length corresponding to the thickness of the smaller portion of the ring B, and that part of each hole $d$ in the larger part of the ring B is left smooth. The flange $c$ of each ring C is provided with a number of slots corresponding to the number of spokes, and the inner face of the ring C, outside of the recess $c'$, has a series of half-holes coinciding with the slots, and forming, with the slots, holes $d'$ to receive half of the spoke, as shown in Figs. 3 and 4. Each ring C, after the spokes D are entered in the ring B, is slipped onto the ring B and secured firmly in place by bolts or screws $d''$, as shown in Fig. 3.

E is the head for each spoke D, and this head is formed of a part $e$ and a part $e'$, as shown in Fig. 2, and has a screw-threaded hole to receive the screw-threaded ends of a spoke D.

F are plates, each having a thimble portion $f$ to receive the part $e$ of the head E, and as many plates F are to be provided as there are spokes used.

G is an annular recess formed in the inner face of the felly and receiving the head E and the thimble part $f$ of the plate F, and of a sufficient depth to leave a space $g$ between its bottom and the end of the head E, as shown in Fig. 2.

H is the felly, of the usual construction.

I is the tire, encompassing the felly, as usual, and, as shown, having countersinks $i$ for the head of bolts $h$, by which the plate F is attached to the felly.

J is a shell encircling the end $a'$ of the hub on one side, and fitting against the flange $c''$, to form a bracing and support for the rings B and C at this end of the hub, and, as shown, the extreme end of $a'$ is encircled by a band J', abutting against the outer end of J.

K is a shell encircling the other end $a'$ of the hub and fitting under the flange $c''$ and held in place, as shown, by screws, so as to form a bracing and support for the rings B and C at this end of the hub, and, as shown, the extreme end of $a'$ is encircled by a band K', abutting against the end of K. The bands J and K also give a finished appearance to the hub, as well as strengthening the bands or rings B and C.

L is the pipe-box for the hub.

M is the axle-spindle.

N is the nut for holding the hub on the spindle M.

A head E is screwed onto each spoke D, and the head is slipped into the socket G in the felly H, and a plate F for each spoke is slipped onto the spoke and set against the face of the felly for the thimble $f$ to receive the end $e$ of the head E, and each plate is attached to the felly by the bolts $h$, which connect the plates, the felly, and the tire with each other, but leave the parts encircling the spokes, and in effect disconnected therefrom, as the thimble $f$ is free to move away from the end $e$ of the head E. The bands B are driven firmly onto their respective ends $a'$ in proper relation for the holes $d$ to line with the respective spokes D for the inner end of each spoke to be screwed into its band or ring B to the extent required to give the proper tension to the spokes and the required strain on the felly and tire constituting the rim of the wheel. After the spokes D have been properly adjusted the rings C are slipped onto the rings B for the spokes to enter the slots and openings $d'$, with the flange $c$ overlying the larger portion of the ring B, after which the ring C is drawn down by the bolts $d''$, firmly clasping the spoke between the rings B and C and clamping it snugly and tightly, so as to prevent any rattle at that point. The shells J and K are slipped onto the respective ends $a'$, and the bands J' and K' driven onto the ends of the hub, respectively, completing the wheel ready for use. The wheel in use is placed on the spindle M and held by the nut N, as usual. The flange $b$, encircling the part $a$ of the hub, gives the ring B a firm support and also adds strength to the hub, and the flange $c$, overlapping the ring B, gives a support for the ring B and also forms a guard against the entrance of dust and dirt around the spoke. The ring C, coacting with the ring B, forms a clamp, by which the hub end of the spokes are each held and clamped, and in case the fit of the openings $d$ and $d'$ is not close enough to prevent rattle a filling of leather or other material can be inserted around the spoke for the ring C to act against and hold the spoke tightly. The ring C is removable by unscrewing the bolts or screws $d''$, and by this feature, in case a spoke is broken at the hub end, the broken end which is screwed into the ring B can be taken out by removing the ring C, which leaves a small portion of the spoke projecting above the ring B, which can be seized by tongs or nippers and the end unscrewed from the hole $d$, so that by removing the plate F a new spoke can be readily inserted in place of the broken one. The plate F, attached to the felly, and its thimble being loosely connected to the head E, permits the felly or rim of the wheel to spring down or inward without injurious effects, as the plate and thimble simply draw away from the head, and the cavity G allows the felly to move inward to the limit of the depth of the cavity without striking the head E, and as the thimble $f$ has a larger interior diameter than that of the spoke, and also encircles the spoke, it will be seen that with the inward movement the thimble cannot come in contact with the spoke to mar or injure it or to rub off the paint.

The feature of a detachable ring coacting with a spoke-receiving ring on the hub enables the spokes to be readily and quickly inserted and screwed to their position, and when in position the clamping detachable ring acts and prevents any rattle of the spoke at the hub end, and these rings B and C, in connection with the shells J and K, enable spokes to be firmly secured to a wooden hub, and also gives a finished appearance to the hub, and the feature of a loose connection between the spoke and the rim of the wheel allows the rim to move inward without injurious effects, and at the same time the head for the spoke and the thimble-plate for the felly furnish a firm attachment of the spoke to the felly, and one which will allow the spokes to be firm and produce the proper tension, as the end $e$ turns freely in the thimble $f$, while the enlarged portion $e'$ draws against the end of the thimble, and consequently against the rim of the wheel.

What I claim as new, and desire to secure by Letters Patent, is—

1. The hub A, having a center $a$ and ends $a'$, in combination with the spoke-receiving ring B, having a series of holes for the spoke ends, each holding and supporting its spoke against end-thrust, and clamping-ring C, substantially as and for the purposes specified.

2. The hub A, having a center $a$ and ends $a'$, in combination with the spoke-receiving rings B, each having a series of holes for the spoke ends, each hole supporting and holding its spoke against end-thrust, clamping-rings C, and shells J K, substantially as and for the purposes specified.

3. The hub A, having the center $a$ and ends $a'$, in combination with the spoke-receiving rings B, clamping-rings C, shells J and K, and bands J' and K', substantially as and for the purposes specified.

4. The spoke-receiving ring B, having the recess $b'$ and a series of holes for the spoke, each hole supporting and holding the spoke against end-thrust, and clamping-ring C, having the recess $c'$, in combination with the spokes D, substantially as and for the purposes specified.

5. The spoke-receiving ring B, having the flange $b$, recess $b'$, and screw-threaded holes $d$, in combination with the clamping-ring C, having the flange $c$, recess $c'$, and openings $d'$, for clamping and holding the spokes of a wheel, substantially as specified.

6. The clamping-ring B, having the recess $b'$ and screw-threaded holes $d$, in combination with the clamping-ring C, having the recess $c'$ and holes $d'$, and the bolts $d''$, substantially as and for the purpose specified.

7. The clamping-ring C, having a flange $c''$, in combination with a supporting-shell encircling the end of a hub and bearing against the flange $c''$, substantially as and for the purpose specified.

8. The hub A, having the center $a$ and ends $a'$, in combination with the ring B, having the flange $b$, recess $b'$, and screw-threaded holes $d$, ring C, having the flange $c$, recess $c'$, openings $d'$, and flange $c''$, spokes D, each having a screw-threaded end, and shells J K, encircling the ends $a'$ of the hub and bearing against the flanges $c''$ of the rings C, substantially as and for the purpose specified.

9. The spoke D and head E, formed in two portions $e$ and $e'$, in combination with the plate F, having a thimble $f$, substantially as and for the purpose specified.

10. The spoke D, head E, formed in two parts $e$ and $e'$, and plate F, having the thimble $f$, in combination with the cavity G, felly H, bolts $h$, and tire I, substantially as and for the purpose specified.

11. The spoke D, head E, formed in two parts $e$ and $e'$, and plate F, having the thimble $f$, in combination with the cavity G and felly H, substantially as and for the purposes specified.

12. The ring B, having a series of holes for receiving the ends of the spokes and supporting and holding the spokes against end-thrust, clamping-ring C, and spokes D, in combination with the double head E and plate F, having the thimble $f$, for connecting the rim of the wheel to its hub by the spokes, substantially as specified.

ARY P. TERRY.

Witnesses:
O. W. BOND,
H. B. HALLOCK.